US009315622B2

(12) United States Patent
Hofmann et al.

(10) Patent No.: US 9,315,622 B2
(45) Date of Patent: Apr. 19, 2016

(54) PROCESS FOR THE PRODUCTION OF POLYETHER CARBONATE POLYOLS

(75) Inventors: Jörg Hofmann, Krefeld (DE); Christoph Gürtler, Köln (DE); Stefan Grasser, Leverkusen (DE); Aurel Wolf, Wülfrath (DE)

(73) Assignee: Covestro Deutschland AG, Leverkusen (DE)

( * ) Notice: Subject to any disclaimer, the term of this patent is extended or adjusted under 35 U.S.C. 154(b) by 151 days.

(21) Appl. No.: 14/232,746

(22) PCT Filed: Jul. 16, 2012

(86) PCT No.: PCT/EP2012/063899
§ 371 (c)(1),
(2), (4) Date: May 27, 2014

(87) PCT Pub. No.: WO2013/010986
PCT Pub. Date: Jan. 24, 2013

(65) Prior Publication Data
US 2014/0256908 A1    Sep. 11, 2014

(30) Foreign Application Priority Data
Jul. 18, 2011 (EP) ..................... 11174406

(51) Int. Cl.
| C08G 65/34 | (2006.01) |
| C08G 64/18 | (2006.01) |
| C08G 64/34 | (2006.01) |
| C08G 65/26 | (2006.01) |
| C08G 65/00 | (2006.01) |

(52) U.S. Cl.
CPC ............. *C08G 65/34* (2013.01); *C08G 64/183* (2013.01); *C08G 64/34* (2013.01); *C08G 65/2603* (2013.01); *C08G 65/2663* (2013.01)

(58) Field of Classification Search
CPC ...................................... C08G 65/34
USPC ................................ 528/405, 408
See application file for complete search history.

(56) References Cited

U.S. PATENT DOCUMENTS

| 3,404,109 | A | 10/1968 | Milgrom |
| 3,829,505 | A | 8/1974 | Herold |
| 3,941,849 | A | 3/1976 | Herold |
| 4,500,704 | A | 2/1985 | Kruper, Jr. et al. |
| 5,158,922 | A | 10/1992 | Hinney et al. |
| 5,470,813 | A | 11/1995 | Le-Khac |
| 6,323,375 | B1 | 11/2001 | Hofmann et al. |
| 6,762,278 | B2 | 7/2004 | Hinz et al. |
| 6,780,813 | B1 | 8/2004 | Hofmann et al. |
| 7,008,900 | B1 | 3/2006 | Hofmann et al. |
| 8,933,192 | B2* | 1/2015 | Gurtler et al. ............... 528/421 |
| 8,946,466 | B2* | 2/2015 | Gurtler et al. ............... 558/266 |
| 9,045,592 | B2* | 6/2015 | Gurtler et al. |
| 9,080,010 | B2* | 7/2015 | Wolf et al. |
| 2003/0149232 | A1 | 8/2003 | Hinz et al. |
| 2003/0204042 | A1 | 10/2003 | Moethrath et al. |
| 2008/0021154 | A1* | 1/2008 | Haider et al. ............... 525/54.2 |

FOREIGN PATENT DOCUMENTS

| CA | 1337448 C | 10/1995 |
| EP | 355000 A1 | 2/1990 |
| EP | 0700949 A2 | 3/1996 |
| EP | 0743093 A1 | 11/1996 |
| EP | 0761708 A2 | 3/1997 |
| EP | 1359177 A1 | 11/2003 |
| EP | 2287226 A1 | 2/2011 |
| JP | 4145123 B2 | 9/2008 |
| WO | WO-97/40086 A1 | 10/1997 |
| WO | WO-98/16310 A1 | 4/1998 |
| WO | WO-99/19063 A1 | 4/1999 |
| WO | WO-00/47649 A1 | 8/2000 |
| WO | WO-01/39883 A1 | 6/2001 |

OTHER PUBLICATIONS

International Search Report for PCT/EP2012/063899 with a mailing date of Sep. 4, 2012.

* cited by examiner

*Primary Examiner* — Duc Truong
(74) *Attorney, Agent, or Firm* — Drinker Biddle & Reath LLP

(57) ABSTRACT

The present invention relates to a method for producing polyether carbonate polyols from one or more H-functional starter substances, one or more alkylene oxides and carbon dioxide, in the presence of at least one double metal cyanide (DMC) catalyst, wherein the double metal cyanide catalyst comprises a complex-forming component selected from the group consisting of polycarbonate diol, polyether carbonate polyol, polyethylene glycol diol and poly(tetramethylene ether diol).

8 Claims, No Drawings

PROCESS FOR THE PRODUCTION OF POLYETHER CARBONATE POLYOLS

RELATED APPLICATIONS

This application is a national stage application (under 35 U.S.C. §371) of PCT/EP2012/063899, filed Jul. 16, 2012, which claims benefit of European Application No. 11174406.6, filed Jul. 18, 2011, which is incorporated by reference herein.

The present invention relates to a method for producing polyether carbonate polyols from one or more H-functional starter substances, one or more alkylene oxides and carbon dioxide, in the presence of at least one double metal cyanide (DMC) catalyst, wherein the double metal cyanide catalyst comprises a complex-forming component selected from the group consisting of polycarbonate diol, polyether carbonate polyol, polyethylene glycol diol and poly(tetramethylene ether diol).

The production of polyether carbonate polyols by catalytic reaction of alkylene oxides (epoxides) and carbon dioxide in the presence or absence of H-functional starter substances (starters) has been under intensive investigation for more than 40 years (e.g. Inoue et al, Copolymerization of Carbon Dioxide and Epoxide with Organometallic Compounds; Die Makromolekulare Chemie 130, 210-220, 1969). This reaction using an H-functional starter compound for example is represented schematically in scheme (I), in which R denotes an organic radical such as alkyl, alkylaryl or aryl, each of which can also comprise heteroatoms such as for example O, S, Si, etc., and in which e and f denote an integer, and wherein the product shown here in scheme (I) is to be understood as representing the polyether carbonate polyol only such that blocks of the illustrated structure can in principle recur in the polyether carbonate polyol obtained, but the sequence, number and length of the blocks and the OH functionality of the starter can vary and are not restricted to the polyether carbonate polyol shown in scheme (I). This reaction (see scheme (I)) is ecologically very advantageous, as this reaction represents the conversion of a greenhouse gas such as $CO_2$ to a polymer. The cyclic carbonate shown in formula (I) (for example propylene carbonate in the case of $R=CH_3$) forms as a further product, in actual fact a secondary product.

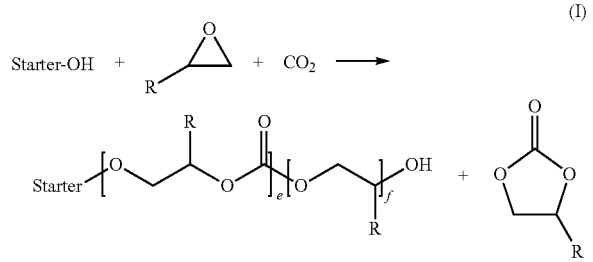

(I)

Activation within the meaning of the invention refers to a step in which a part amount of alkylene oxide compound, optionally in the presence of $CO_2$, is added to the DMC catalyst and then the addition of the alkylene oxide compound is interrupted, wherein owing to a subsequent exothermic chemical reaction a temperature build-up, which can lead to a temperature peak (hotspot), is observed, together with a pressure drop in the reactor owing to the reaction of alkylene oxide and optionally $CO_2$. The activation process step is the time period from the addition to the DMC catalyst of the part amount of alkylene oxide compound, optionally in the presence of $CO_2$, to the occurrence of the temperature build-up. The activation step can generally be preceded by a step to dry the DMC catalyst and optionally the starter at elevated temperature and/or reduced pressure, wherein this drying step does not form part of the activation step within the meaning of the present invention.

The formation of copolymers from epoxides (e.g. propylene oxide) and carbon dioxide has been known for some time. Thus U.S. Pat. No. 4,500,704 for example describes the copolymerisation of carbon dioxide and propylene oxide using DMC catalysts. In this case, for example, 71% of the propylene oxide was converted in a reactor, starting from a starter substance and 12.3 g of propylene oxide (212 mmol) and under a carbon dioxide pressure of 48 bar, after 48 hours at 35° C. Of the converted 150.5 mmol of propylene oxide, 27 mmol (18%) reacted to the generally unwanted secondary product propylene carbonate.

U.S. Pat. No. 6,762,278 B2 concerns the object of providing crystalline multi-metal cyanide catalysts, which in the copolymerisation of epoxides and carbon dioxide are said to lead to an improved incorporation of carbon dioxide. U.S. Pat. No. 6,762,278 B2 discloses multi-metal cyanide catalysts which have a content of platelet-like particles of at least 30 wt. % and which can comprise as an organic complex compound inter alia polyether alcohols, which form by polyaddition of epoxides to alcohols.

An object of the present invention was to provide a method for producing polyether carbonate polyols that offers a favourable selectivity (i.e. low ratio of cyclic carbonate to linear polyether carbonate).

Surprisingly it was found that the aforementioned object is achieved by a method for producing polyether carbonate polyols from one or more H-functional starter substances, one or more alkylene oxides and carbon dioxide, in the presence of a DMC catalyst, characterised in that the double metal cyanide catalyst comprises at least one complex-forming component selected from the group consisting of polycarbonate diol, polyether carbonate polyol, polyethylene glycol diol and poly(tetramethylene ether diol).

A preferred embodiment of the invention provides a method for producing polyether carbonate polyols from one or more H-functional starter substances, one or more alkylene oxides and carbon dioxide, in the presence of a DMC catalyst, characterised in that the DMC catalyst comprises at least one complex-forming component selected from the group consisting of polycarbonate diol, polyether carbonate polyol, polyethylene glycol diol and poly(tetramethylene ether diol), wherein (α) the H-functional starter substance or a mixture of at least two H-functional starter substances is prepared and optionally water and/or other highly volatile compounds are removed by elevated temperature and/or reduced pressure ("drying"), wherein the DMC catalyst is added to the H-functional starter substance or to the mixture of at least two H-functional starter substances before or after drying, (β) for activation purposes a part amount (relative to the total amount of the amount of alkylene oxides used in steps (β) and (γ)) of one or more alkylene oxides is added to the mixture resulting from step (α), wherein this addition of a part amount of alkylene oxide can optionally take place in the presence of $CO_2$, and wherein the temperature peak (hotspot) occurring because of the subsequent exothermic chemical reaction and/or a pressure drop in the reactor is then awaited, and wherein the activation step (β) can also be performed more than once, (γ) one or more alkylene oxides and carbon dioxide are metered continuously into the mixture resulting from step (β) ("copolymerisation"), wherein the alkylene oxides used for the copolymerisation can be the same as or different from the alkylene oxides used in step (β).

In the activation step (step (β)) a part amount of alkylene oxide compound, optionally in the presence of CO2, is added to the DMC catalyst, wherein owing to a subsequent exothermic chemical reaction a temperature peak (hotspot) and/or a pressure drop in the reactor is observed. In the activation step of the method according to the invention the part amount of alkylene oxide compound can also comprise one or more additives A) and the DMC catalyst can be mixed with one or more additives A) and optionally with one or more metal salts. The activation process step is the time period from the addition to the DMC catalyst of the part amount of alkylene oxide compound, optionally in the presence of $CO_2$, to the hotspot. The activation step can generally be preceded by a step to dry the DMC catalyst, optionally one or more additives A) and optionally one or more metal salts and optionally the starter by elevated temperature and/or reduced pressure, wherein this drying step does not form part of the activation step within the meaning of the present invention.

Alkylene oxides (epoxides) having 2 to 24 carbon atoms can generally be used for the method according to the invention. The alkylene oxides having 2 to 24 carbon atoms are for example one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or poly-epoxidised fats as mono-, di- and triglycerides, epoxidised fatty acids, $C_1$-$C_{24}$ esters of epoxidised fatty acids, epichlorohydrin, glycidol, and derivatives of glycidol such as for example methyl glycidyl ether, ethyl glycidyl ether, 2-ethylhexyl glycidyl ether, allyl glycidyl ether, glycidyl methacrylate and epoxy-functional alkoxysilanes such as for example 3-glycidyloxypropyl trimethoxysilane, 3-glycidyloxypropyl triethoxysilane, 3-glycidyloxypropyl tripropoxysilane, 3-glycidyloxypropyl methyl dimethoxysilane, 3-glycidyloxypropyl ethyl diethoxysilane, 3-glycidyloxypropyl triisopropoxysilane. Ethylene oxide and/or propylene oxide, in particular propylene oxide, are preferably used as alkylene oxides in step (i).

Compounds having active H atoms for the alkoxylation can be used as a suitable H-functional starter substance. Active groups having active H atoms for the alkoxylation are for example —OH, —NH$_2$ (primary amines), —NH— (secondary amines), —SH and —CO$_2$H, with —OH and —NH$_2$ being preferred and —OH being particularly preferred. One or more compounds selected from the group consisting of mono- or polyhydric alcohols, polyvalent amines, polyvalent thiols, amino alcohols, thio alcohols, hydroxy esters, polyether polyols, polyester polyols, polyester ether polyols, polyether carbonate polyols, polycarbonate polyols, polycarbonates, polyethyleneimines, polyether amines (for example Jeffamine® from Huntsman, such as for example D-230, D-400, D-2000, T-403, T-3000, T-5000 or corresponding products from BASF, such as for example polyether amine D230, D400, D200, T403, T5000), polytetrahydrofurans (for example PolyTHF® from BASF, such as for example PolyTHF® 250, 650S, 1000, 1000S, 1400, 1800, 2000), polytetrahydrofuran amines (BASF product polytetrahydrofuran amine 1700), polyether thiols, polyacrylate polyols, castor oil, the mono- or diglyceride of ricinoleic acid, monoglycerides of fatty acids, chemically modified mono-, di- and/or triglycerides of fatty acids, and $C_1$-$C_{24}$ alkyl fatty acid esters, which on average comprise at least 2OH groups per molecule, are used for example as the H-functional starter substance. By way of example, the $C_1$-$C_{24}$ alkyl fatty acid esters, which on average comprise at least 2OH groups per molecule, are commercial products such as Lupranol Balance® (BASF AG), Merginol® grades (Hobum Oleochemicals GmbH), Sovermol® grades (Cognis Deutschland GmbH & Co. KG) and Soyol®TM grades (USSC Co.).

Alcohols, amines, thiols and carboxylic acids can be used as monofunctional starter compounds. The following can be used as monofunctional alcohols: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propagyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Suitable monofunctional amines include: butylamine, tert-butylamine, pentylamine, hexylamine, aniline, aziridine, pyrrolidine, piperidine, morpholine. The following can be used as monofunctional thiols: ethanethiol, 1-propanethiol, 2-propanethiol, 1-butanethiol, 3-methyl-1-butanethiol, 2-butene-1-thiol, thiophenol. The following can be mentioned as monofunctional carboxylic acids: formic acid, acetic acid, propionic acid, butyric acid, fatty acids such as stearic acid, palmitic acid, oleic acid, linoleic acid, linolenic acid, benzoic acid, acrylic acid.

Suitable polyhydric alcohols as H-functional starter substances are for example dihydric alcohols (such as for example ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as for example 3-methyl-1,5-pentanediol), 1,6-hexanediol; 1,8-octanediol, 1,10-decanediol, 1,12-dodecanediol, bis(hydroxymethyl) cyclohexane (such as for example 1,4-bis(hydroxymethyl) cyclohexane), triethylene glycol, tetraethylene glycol, polyethylene glycols, dipropylene glycol, tripropylene glycol, polypropylene glycol, dibutylene glycol and polybutylene glycol); trihydric alcohols (such as for example trimethylolpropane, glycerol, trishydroxyethyl isocyanurate, castor oil); tetrahydric alcohols (such as for example pentaerythritol); polyalcohols (such as for example sorbitol, hexitol, sucrose, starch, starch hydrolysates, cellulose, cellulose hydrolysates, hydroxyfunctionalised fats and oils, in particular castor oil), and all modification products of these aforementioned alcohols with varying amounts of s-caprolactone.

The H-functional starter substances can also be selected from the substance class of polyether polyols, in particular those having a molecular weight Mn in the range from 100 to 4000 g/mol. Polyether polyols synthesised from repeating ethylene oxide and propylene oxide units are preferred, preferably having a proportion of 35 to 100% propylene oxide units, particularly preferably having a proportion of 50 to 100% propylene oxide units. They can be random copolymers, gradient copolymers, alternating or block copolymers of ethylene oxide and propylene oxide. Suitable polyether polyols synthesised from repeating propylene oxide and/or ethylene oxide units are for example the Desmophen®, Acclaim®, Arcol®, Baycoll®, Bayfill®, Bayflex®, Baygal®, PET® and polyether polyols from Bayer MaterialScience AG (such as for example Desmophen® 3600Z, Desmophen® 1900U, Acclaim® Polyol 2200, Acclaim® Polyol 4000I, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homo-polyethylene oxides are for example the Pluriol® E brands from BASF SE; suitable homo-polypropylene oxides are for example the Pluriol® P brands from BASF SE; suitable mixed copolymers of ethylene oxide and propylene oxide are for example the Pluronic® PE or Pluriol® RPE brands from BASF SE.

The H-functional starter substances can also be selected from the substance class of polyester polyols, in particular those having a molecular weight Mn in the range from 200 to 4500 g/mol. At least difunctional polyesters are used as polyester polyols. Polyester polyols preferably consist of alternating acid and alcohol units. Succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the cited acids and/or anhydrides for example are used as acid components. Ethanediol, 1,2-propanediol, 1,3-propanediol, 1,4-butanediol, 1,5-pentanediol, neopentyl glycol, 1,6-hexanediol, 1,4-bis-(hydroxymethyl)cyclohexane, diethylene glycol, dipropylene glycol, trimethylolpropane, glycerol, pentaerythritol or mixtures of the cited alcohols for example are used as alcohol components. If dihydric or polyhydric polyether polyols are used as the alcohol component, polyester ether polyols are obtained that can likewise serve as starter substances for producing the polyether carbonate polyols. Polyether polyols having an Mn of 150 to 2000 g/mol are preferably used to produce the polyester ether polyols.

Polycarbonate polyols (such as for example polycarbonate diols) can moreover be used as H-functional starter substances, in particular those having a molecular weight Mn in the range from 150 to 4500 g/mol, preferably 500 to 2500, which are produced for example by reacting phosgene, dimethyl carbonate, diethyl carbonate or diphenyl carbonate and di- and/or polyfunctional alcohols or polyester polyols or polyether polyols. Examples of polycarbonate polyols can be found for example in EP-A 1359177. The Desmophen® C grades from Bayer MaterialScience AG for example can be used as polycarbonate diols, such as for example Desmophen® C 1100 or Desmophen® C 2200.

In a further embodiment of the invention, polyether carbonate polyols can be used as H-functional starter substances. In particular, polyether carbonate polyols obtainable by the method according to the invention described here according to step (i) or step (ii) or step (iii) can be used. To this end these polyether carbonate polyols used as H-functional starter substances are produced in advance in a separate reaction step.

The H-functional starter substances generally have a functionality (i.e. number of active H-atoms for polymerisation per molecule) of 1 to 8, preferably of 2 or 3. The H-functional starter substances are used either individually or as a mixture of at least two H-functional starter substances.

Preferred H-functional starter substances are alcohols of the general formula (II), $$HO-(CH_2)_x-OH \quad (II)$$

in which x is a number from 1 to 20, preferably an even number from 2 to 20. Examples of alcohols according to formula (II) are ethylene glycol, 1,4-butanediol, 1,6-hexanediol, 1,8-octanediol, 1,10-decanediol and 1,12-dodecanediol. Further preferred H-functional starter substances are neopentyl glycol, trimethylolpropane, glycerol, pentaerythritol, reaction products of the alcohols according to formula (II) with ε-caprolactone, for example reaction products of trimethylolpropane with ε-caprolactone, reaction products of glycerol with ε-caprolactone, and reaction products of pentaerythritol with ε-caprolactone. Water, diethylene glycol, dipropylene glycol, castor oil, sorbitol and polyether polyols synthesised from repeating polyalkylene oxide units are moreover preferably used as H-functional starter substances.

The H-functional starter substances are particularly preferably one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trifunctional polyether polyols, wherein the polyether polyol is synthesised from a di- or tri-H-functional starter substance and propylene oxide or from a di- or tri-H-functional starter substance, propylene oxide and ethylene oxide. The polyether polyols preferably have a number-average molecular weight Mn in the range from 62 to 4500 g/mol and a functionality of 2 to 3 and in particular a molecular weight Mn in the range from 62 to 3000 g/mol and a functionality of 2 to 3.

The polyether carbonate polyols are produced by catalytic addition of carbon dioxide and alkylene oxides to H-functional starter substances. "H-functional" within the meaning of the invention is understood to mean the number of active H atoms for alkoxylation per molecule of the starter compound.

DMC catalysts for use in the homopolymerisation of epoxides are known in principle from the prior art (see for example U.S. Pat. No. 3,404,109, U.S. Pat. No. 3,829,505, U.S. Pat. No. 3,941,849 and U.S. Pat. No. 5,158,922). DMC catalysts, which are described for example in U.S. Pat. No. 5,470,813, EP-A 700 949, EP-A 743 093, EP-A 761 708, WO-A 97/40086, WO-A 98/16310 and WO-A 00/47649, have a very high activity in the homopolymerisation of epoxides and allow the production of polyether polyols at very low catalyst concentrations (25 ppm or less), so that separation of the catalyst from the finished product is generally no longer necessary. The highly active DMC catalysts described in EP-A 700 949, which in addition to a double metal cyanide compound (for example zinc hexacyanocobaltate(III)) and an organic complex ligand (for example tert-butanol) also comprise a polyether having a number-average molecular weight of over 500 g/mol, are a typical example.

The DMC catalysts are obtained by
(a) in the first step reacting an aqueous solution of a metal salt with the aqueous solution of a metal cyanide salt in the presence of one or more organic complex ligands, for example an ether or alcohol,
(b) wherein in the second step the solid is separated from the suspension obtained from (i) by known techniques (such as centrifugation or filtration),
(c) wherein optionally in a third step the isolated solid is washed with an aqueous solution of an organic complex ligand (for example by resuspension and subsequent renewed isolation by filtration or centrifugation),
(d) wherein the solid obtained is then dried at temperatures of in general 20 to 120° C. and under pressures of generally 0.1 mbar to normal pressure (1013 mbar), optionally after being pulverised,
and wherein in the first step or immediately after precipitation of the double metal cyanide compound (second step) one or more organic complex ligands, preferably in excess (relative to the double metal cyanide compound), and at least one complex-forming component are added, characterised in that the complex-forming component is selected from at least one of the group consisting of polycarbonate diol, polyether carbonate polyol, polyethylene glycol diol and poly(tetramethylene ether diol).

The double metal cyanide compounds comprised in the DMC catalysts are the reaction products of water-soluble metal salts and water-soluble metal cyanide salts.

For example, an aqueous solution of zinc chloride (preferably in excess relative to the metal cyanide salt such as for example potassium hexacyanocobaltate) and potassium hexacyanocobaltate is mixed, and then dimethoxyethane (glyme) or tert-butanol (preferably in excess, relative to zinc hexacyanocobaltate) and polycarbonate diol, polyether carbonate polyol, polyethylene glycol diol or poly(tetramethylene ether diol) are added to the suspension that is formed.

Suitable metal salts for producing the double metal cyanide compounds preferably have the general formula (III), $$M(X)_n \quad \text{(III)}$$

in which
M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, with M preferably being $Zn^{2+}$, $Fe^{2+}$, $Co^{2+}$ or $Ni^{2+}$,
X is one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
n is 1 if X=sulfate, carbonate or oxalate and
n is 2 if X=halide, hydroxide, carboxylate, cyanate, thiocyanate, isocyanate, isothiocyanate or nitrate,
or suitable metal salts have the general formula (IV), $$M_r(X)_3 \quad \text{(IV)}$$

in which
M is selected from the metal cations $Fe^{3+}$, $Al^{3+}$, $Co^{3+}$ and $Cr^{3+}$,
X is one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
r is 2 if X=sulfate, carbonate or oxalate and
r is 1 if X=halide, hydroxide, carboxylate, cyanate, thiocyanate, isocyanate, isothiocyanate or nitrate,
or suitable metal salts have the general formula (V), $$M(X)_s \quad \text{(V)}$$

in which
M is selected from the metal cations $Mo^{4+}$, $V^{4+}$ and $W^{4+}$
X is one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
s is 2 if X=sulfate, carbonate or oxalate and
s is 4 if X=halide, hydroxide, carboxylate, cyanate, thiocyanate, isocyanate, isothiocyanate or nitrate,
or suitable metal salts have the general formula (VI), $$M(X)_t \quad \text{(VI)}$$

in which
M is selected from the metal cations $Mo^{6+}$ and $W^{6+}$

X is one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
t is 3 if X=sulfate, carbonate or oxalate and
t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetyl acetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. Mixtures of different metal salts can also be used.

Suitable metal cyanide salts for producing the double metal cyanide compounds preferably have the general formula (VII), $$(Y)_a M'(CN)_b (A)_c \quad \text{(VII)}$$

in which
M' is selected from one or more metal cations of the group consisting of Fe(II), Fe(III), Co(II), Co(III), Cr(II), Cr(III), Mn(II), Mn(III), Ir(III), Ni(II), Ru(II), V(IV) and V(V), M' preferably being one or more metal cations of the group consisting of Co(II), Co(III), Fe(II), Fe(III), Cr(III), Ir(III) and Ni(II),
Y is selected from one or more metal cations of the group consisting of alkali metal (i.e. $Li^+$, $Na^+$, $K^+$, $Rb^+$) and alkaline-earth metal (i.e. $Be^{2+}$, $Mg^{2+}$, $Ca^{2+}$, $Sr^{2+}$, $Ba^{2+}$),
A is selected from one or more anions of the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate, and a, b and c are integers, wherein the values for a, b and c are chosen such that the electroneutrality of the metal cyanide salt is assured; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate(III), potassium hexacyanoferrate(II), potassium hexacyanoferrate (III), calcium hexacyanocobaltate(III) and lithium hexacyanocobaltate(III).

Preferred double metal cyanide compounds that are comprised in the DMC catalysts are compounds of the general formula (VIII)

$$M_x[M'_{x'}(CN)_y]_z \quad \text{(VIII)},$$

in which M is defined as in formula (III) to (VI) and
M' is defined as in formula (VII), and
x, x', y and z are integers and are chosen such that the electroneutrality of the double metal cyanide compound is assured.

By preference,
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate (III). Further examples of suitable double metal cyanide compounds can be found for example in U.S. Pat. No. 5,158,922 (column 8, lines 29 to 66). Zinc hexacyanocobaltate(III) is particularly preferably used.

The organic complex ligands added in the production of the DMC catalysts are disclosed for example in U.S. Pat. No. 5,158,922 (see in particular column 6, lines 9 to 65), U.S. Pat. No. 3,404,109, U.S. Pat. No. 3,829,505, U.S. Pat. No. 3,941, 849, EP-A 700 949, EP-A 761 708, JP 4 145 123, U.S. Pat. No. 5,470,813, EP-A 743 093 and WO-A 97/40086). For example, water-soluble, organic compounds having heteroatoms, such as oxygen, nitrogen, phosphorus or sulfur, which can form complexes with the double metal cyanide compound, are used as organic complex ligands. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds comprising both aliphatic or cycloaliphatic ether groups and aliphatic hydroxyl groups (such as for example ethylene glycol mono-tert-butyl ether, diethylene glycol mono-tert-butyl ether, tripropylene glycol monomethyl ether and 3-methyl-3-oxetanemethanol). Most highly preferred organic complex ligands are selected from one or more compounds of the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

Within the meaning of the invention one or more complex-forming component(s) from the compound classes of polycarbonate diols, polyether carbonate polyols, polyethylene glycol diols and poly(tetramethylene ether diol) are used in the production of the DMC catalysts. In a preferred embodiment the following is used as the complex-forming component:
  A) poly(tetramethylene ether diol) having a molar mass from 500 to 5000 g/mol, particularly preferably from 550 to 1500 g/mol,
  B) polyethylene glycol diol having a molar mass from 500 to 2500 g/mol, particularly preferably from 600 to 1500 g/mol,
  C) polyether carbonate polyol having a molar mass from 500 to 5000 g/mol, particularly preferably from 1000 to 3000 g/mol, and/or
  D) polycarbonate diol having a molar mass from 500 to 5000 g/mol, particularly preferably from 1000 to 3000 g/mol.

Poly(tetramethylene ether diols) A) within the meaning of the invention are polyether polyols based on tetramethylene ether glycol, also known as polytetrahydrofuran (PTHF) or polyoxybutylene glycol. These poly(tetramethylene ether diols) have a hydroxyl functionality of two, i.e. they comprise two OH groups per molecule. They can be produced for example by cationic polymerisation of tetrahydrofuran (THF) with the aid of catalysts. Either preformed catalysts are used here as catalysts, or the catalysts are produced in situ in the reaction mixture. This is done by producing oxonium ions in the reaction medium with the aid of strong Lewis acids (e.g. boron trichloride, aluminium chloride, tin tetrachloride, antimony pentachloride, iron(III) chloride or phosphorus pentafluoride) or by means of strong Brønstedt acids (such as perchloric acid, tetrafluoroboric acid, fluorosulfonic acid, chlorosulfonic acid, hexachlorostannic acid, iodic acid or hexachloroantimonic(V) acid) and with the aid of reactive compounds known as promoters (such as alkylene oxides, e.g. ethylene oxide, propylene oxide, epichlorohydrin or butylene oxide, oxetanes, orthoesters, acetals, α-halogen ethers, benzyl halides, triarylmethyl halides, acid chlorides, β-lactones, carboxylic anhydrides, thionyl chloride, phosphorus oxychloride or sulfonic acid halides), which oxonium ions initiate polymerisation of the THF.

In pilot-scale production PTHF can be produced in a single stage by THF polymerisation with water, 1,4-butanediol or with low-molecular-weight PTHF as a telogen (chain termination reagent) on acid catalysts. Both homogeneous systems, dissolved in the reaction system, and heterogeneous, i.e. largely undissolved, systems are known as catalysts. The relatively low THF conversions that are achieved above all in the synthesis of PTHF of molecular weight 650 to 3000 are disadvantageous, however. In large-scale production two-stage methods are predominantly performed, in which for example THF is first polymerised to polytetrahydrofuran esters in the presence of fluorosulfonic acid and then hydrolysed to PTHF. Higher THF conversions are usually achieved with this form of THF polymerisation than with single-stage methods. THF polymerisation in the presence of carboxylic anhydrides, such as for example acetic anhydride, in the presence of acid catalysts to form PTHF diacetates and subsequent interesterification of the PTHF diacetates with for example methanol to form PTHF and methyl acetate is advantageous above all. Such polytetrahydrofurans are commercially available, for example from BASF SE under the trade name PolyTHF® or from INVISTA under the trade name Terathane®.

Polyethylene glycol diols B) within the meaning of the invention are polyether polyols based on an H-functional starter substance having two active H atoms for alkoxylation and on ethylene oxide. The production of such pure ethylene oxide polyether diols generally takes place by means of ring-opening polymerisation of ethylene oxide (oxirane) with catalysts. Lewis acids (for example boron trifluoride, tin tetrachloride, zinc dichloride) or basic compounds such as alkyl zinc or alkyl aluminium compounds, strontium or calcium carbonate, calcium amide, calcium amide alkoxide, alkali or alkaline-earth metal hydroxides, alkanolates or phenolates for example are used to this end as catalysts. A dihydric alcohol such as for example ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentane diols (such as for example 3-methyl-1,5-pentanediol), 1,6-hexanediol, 1,8-octanediol, 1,10-decanediol, 1,12-dodecanediol, bis(hydroxymethyl)cyclohexane (such as for example 1,4-bis(hydroxymethyl)cyclohexane), triethylene glycol, tetraethylene glycol, polyethylene glycol, dipropylene glycol, tripropylene glycol, polypropylene glycol, dibutylene glycol and polybutylene glycol for example is used as the H-functional starter substance. Methods for producing ethylene oxide polyethers are well known to the person skilled in the art and are described in detail in for example "Houben-Weyl, Methoden der organischen Chemie", Volume 14/2, Makromolekulare Stoffe, 4$^{th}$ Edition, 1963, p. 425-453, "Houben-Weyl, Methoden der organischen Chemie", Volume E20, Makromolekulare Stoffe, 4$^{th}$ Edition, 1987, p. 1367-1368 and "Encyclopedia of Polymer Science and Engineering", Volume 6, 2$^{nd}$ Edition, 1987, p. 225-230 and 234-254.

Polyether carbonate polyols C) within the meaning of the invention are obtainable for example by catalytic reaction of alkylene oxides and carbon dioxide in the presence of H-functional starter substances, for example by the method according to the invention. The polyether carbonate polyols C) used as the complex-forming component can also be produced by other methods known to the person skilled in the art, for example by partial alcoholysis of polycarbonate polyols with di- or tri-functional hydroxy compounds. The polyether carbonate polyols C) used as the complex-forming component preferably have an average hydroxyl functionality of 1 to 6, particularly preferably 2 to 3, most highly preferably two.

Polycarbonate diols D) within the meaning of the invention are obtainable for example by polycondensation of difunctional hydroxy compounds (generally bis-hydroxy compounds such as alkanediols or bisphenols) with carbonic acid derivatives, such as for example phosgene or bis[chlorocarbonyloxy] compounds (for example of the formula Cl—C(=O)—O—CH$_2$—O—C(=O)—Cl), carbonic acid diesters (such as diphenyl carbonate or dimethyl carbonate) or urea. Methods for producing polycarbonates are generally well known and are described in detail in for example "Houben-Weyl, Methoden der organischen Chemie", Volume E20, Makromolekulare Stoffe, 4$^{th}$ Edition, 1987, p. 1443-1457, "Ullmann's Encyclopedia of Industrial Chemistry", Volume A21, 5$^{th}$ Edition, 1992, p. 207-215 and "Encyclopedia of Polymer Science and Engineering", Volume 11, 2$^{nd}$ Edition, 1988, p. 648-718. Aliphatic polycarbonate diols having a molar mass from 500 to 5000 g/mol, most highly preferably from 1000 to 3000 g/mol, are particularly preferably used. These are generally obtained from non-vicinal diols by reaction with diaryl carbonate, dialkyl carbonate, dioxolanones, phosgene, bischloroformic acid esters or urea (see for example EP-A 292 772 and the documents cited therein). Suitable non-vicinal diols are in particular 1,4-butanediol, neopentyl glycol, 1,5-pentanediol, 2-methyl-1,5-pentanediol, 3-methyl-1,5-pentanediol, 1,6-hexanediol, bis-(6-hydroxyhexyl)ether, 1,7-heptanediol, 1,8-octanediol, 2-methyl-1,8-octanediol, 1,9-nonanediol, 1,10-decanediol, 1,4-bis-hydroxymethyl cyclohexane, diethylene glycol, triethylene glycol, tetraethylene glycol, dipropylene glycol, tripropylene glycol, tetrapropylene glycol, alkoxylation products of diols with ethylene oxide and/or propylene oxide and/or tetrahydrofuran with molar masses up to 1000 g/mol, preferably 200-700 g/mol, and in rarer cases the dimer diols, which are obtainable by reducing both carboxyl groups of dimer acids, which in turn can be obtained by dimerisation of unsaturated vegetable fatty acids. The non-vicinal diols can be used individually or in mixtures. The reaction can be catalysed by bases or transition metal compounds in the manner known to the person skilled in the art.

The number-average molecular weight (also known as molar mass) was calculated from the experimentally determined OH value.

In the production of the DMC catalysts the aqueous solutions of the metal salt (e.g. zinc chloride), used in stoichiometric excess (at least 50 mol %) relative to metal cyanide salt, in other words at least a molar ratio of metal salt to metal cyanide salt of 2.25 to 1.00) and of the metal cyanide salt (e.g. potassium hexacyanocobaltate) are preferably reacted in the presence of the organic complex ligand (e.g. tert-butanol) in the first step, forming a suspension comprising the double metal cyanide compound (e.g. zinc hexacyanocobaltate), water, excess metal salt and the organic complex ligand. The organic complex ligand can be present in the aqueous solution of the metal salt and/or of the metal cyanide salt, or it is added directly to the suspension obtained after precipitation of the double metal cyanide compound. It has proved advantageous to mix the aqueous solutions of the metal salt and the metal cyanide salt and the organic complex ligand with vigorous stirring. Within the meaning of the invention the suspension formed in the first step is then treated with at least one complex-forming component. The complex-forming component is preferably used in a mixture with water and organic complex ligand. A preferred method for performing the first step (i.e. production of the suspension) takes place using a mixing nozzle, particularly preferably using a jet disperser as described in WO-A 01/39883.

Isolation of the solid (i.e. the precursor of the catalyst according to the invention) from the suspension by known techniques, such as centrifugation or filtration, takes place in the second step.

In a preferred embodiment variant the isolated solid is then washed in a third process step with an aqueous solution of the organic complex ligand (e.g. by resuspension and subsequent renewed isolation by filtration or centrifugation). Water-soluble secondary products such as potassium chloride for example can be removed from the catalyst in this way. The amount of organic complex ligand in the aqueous washing solution is preferably between 40 and 80 wt. %, relative to the complete solution. At least one complex-forming component, preferably in the range between 0.5 and 5 wt. %, relative to the complete solution, is particularly preferably added to the aqueous washing solution in the third step.

It is moreover advantageous to wash the isolated solid more than once. In a first washing step (c-1) an aqueous solution of the unsaturated alcohol is used for washing (e.g. by resuspension and subsequent renewed isolation by filtration or centrifugation), in order to remove water-soluble secondary products such as potassium chloride for example from the catalyst according to the invention. The amount of unsaturated alcohol in the aqueous washing solution is particularly preferably between 40 and 80 wt. %, relative to the complete solution of the first washing step. In the further washing steps (c-2) either the first washing step is repeated one or more times, preferably one to three times, or preferably a non-aqueous solution, such as for example a mixture or solution of unsaturated alcohol and at least one complex-forming component (preferably in the range between 0.5 and 5 wt. %, relative to the total amount of washing solution of step (c-2)), is used as the washing solution and the solid is washed with it one or more times, preferably one to three times.

The isolated and optionally washed solid is then dried at temperatures of in general 20 to 100° C. and under pressures of generally 0.1 mbar to normal pressure (1013 mbar) after being pulverised.

A preferred method for isolating the DMC catalysts according to the invention from the suspension by filtration, filter cake washing and drying is described in WO-A 01/80994.

The polyether carbonate polyols obtainable by the method according to the invention have a low content of secondary products and can be processed without difficulty, in particular by reaction with di- and/or polyisocyanates to form polyurethanes, in particular polyurethane flexible foams. Polyether carbonate polyols based on an H-functional starter compound having a functionality of at least 2 are preferably used for polyurethane applications. The polyether carbonate polyols obtainable by the method according to the invention can furthermore be used in applications such as washing and cleaning agent formulations, drilling fluids, fuel additives, ionic and non-ionic surfactants, lubricants, process chemicals for paper or textiles production or cosmetic formulations. The person skilled in the art is aware that, depending on the area of application, the polyether carbonate polyols to be used must satisfy certain material properties, such as for example molecular weight, viscosity, polydispersity, functionality and/or hydroxyl value.

For production of the polyurethane flexible foams the reaction components are reacted by the single-stage method known per se, wherein mechanical equipment is often used, such as is described for example in EP-A 355 000. Details of processing equipment that is also suitable according to the invention are described in Kunststoff-Handbuch, Volume VII, edited by Vieweg and Hoehtlen, Carl-Hanser-Verlag, Munich 1993, for example on pages 139 to 265. The polyurethane flexible foams can be produced as moulded or block foams. The polyurethane flexible foams are used for example in furniture upholstery, fabric inlays, mattresses, car seats, head rests, arm rests, sponges and structural elements.

EXAMPLES

The OH value (hydroxyl value) was determined by reference to DIN 53240-2, but using pyridine in place of THF/dichloromethane as the solvent. Titration was performed with 0.5 molar ethanolic KOH (end point detection by potentiometry). Castor oil with a certified OH value was used as the test substance. The statement of the unit in "mg/g" relates to mg[KOH]/g[polyether carbonate polyol].

The proportion of incorporated $CO_2$ in the resulting polyether carbonate polyol and the ratio of propylene carbonate to polyether carbonate polyol was determined by $^1$H-NMR (Bruker, DPX 400, 400 MHz; pulse program zg30, waiting time dl: 10 s, 64 scans). Each sample was dissolved in deuterated chloroform. The relevant resonances in $^1$H-NMR (relative to TMS=0 ppm) are as follows:

cyclic carbonate (formed as a secondary product) resonance at 4.5 ppm, carbonate resulting from carbon dioxide incorporated in the polyether carbonate polyol (resonances at 5.1 to 4.8 ppm), unreacted PO with resonance at 2.4 ppm, polyether polyol (i.e. without incorporated carbon dioxide) with resonances at 1.2 to 1.0 ppm, the 1,8-octanol incorporated as the starter molecule with a resonance at 1.6 to 1.52 ppm.

The molar fraction of the carbonate incorporated in the polymer in the reaction mixture is calculated in accordance with formula (XI) as follows, with the following abbreviations being used:

F(4.5)=area of the resonance at 4.5 ppm for cyclic carbonate (corresponds to an H atom)
F(5.1-4.8)=area of the resonance at 5.1-4.8 ppm for polyether carbonate polyol and an H atom for cyclic carbonate
F(2.4)=area of the resonance at 2.4 ppm for free, unreacted PO
F(1.2-1.0)=area of the resonance at 1.2-1.0 ppm for polyether polyol
F(1.6-1.52)=area of the resonance at 1.6 to 1.52 ppm for 1,8-octanediol (starter)

Taking account of the relative intensities, the polymeric bonded carbonate ("linear carbonate" LC) in the reaction mixture was converted into mol % using formula (IX) below:

$$LC = \frac{F(5.1-4.8) - F(4.5)}{F(5.1-4.8) + F(2.4) + 0.33 * F(1.2-1.0) + 0.25 * F(1.6-1.52)} * 100 \quad \text{(IX)}$$

The percentage by weight (in wt. %) of polymer-bonded carbonate (LC') in the reaction mixture was calculated in accordance with formula (X)

$$LC' = \frac{[F(5.1-4.8) - F(4.5)] * 102}{N} * 100\% \quad \text{(X)}$$

in which the value for N ("denominator" N) is calculated in accordance with formula (XI):

$$N = [F(5.1-4.8) - F(4.5)]*102 + F(4.5)*102 + F(2.4)*58 + 0.33*F(1.2-1.0)*58 + 0.25*F(1.6-1.52)*146 \quad \text{(XI)}$$

The factor 102 results from the sum of the molar masses of $CO_2$ (molar mass 44 g/mol) and of propylene oxide (molar mass 58 g/mol), the factor 58 results from the molar mass of propylene oxide and the factor 146 results from the molar mass of the starter 1,8-octanediol used.

The percentage by weight (in wt. %) of cyclic carbonate (CC') in the reaction mixture was calculated in accordance with formula (XII)

$$CC' = \frac{F(4.5) * 102}{N} * 100\% \quad \text{(XII)}$$

in which the value for N is calculated in accordance with formula (XI).

To calculate the composition relative to the polymer component (consisting of polyether polyol, which was synthesised from the starter and propylene oxide during the activation steps taking place under $CO_2$-free conditions, and polyether carbonate polyol, synthesised from the starter, propylene oxide and carbon dioxide during the activation steps taking place in the presence of $CO_2$ and during copolymerisation) from the values of the composition of the reaction mixture, the non-polymer constituents of the reaction mixture (i.e. cyclic propylene carbonate and unreacted propylene oxide optionally present) were eliminated by calculation. The percentage by weight of the carbonate repeating units in the polyether carbonate polyol was converted into a percentage by weight of carbon dioxide using the factor F=44/(44+58). The statement of the $CO_2$ content in the polyether carbonate polyol ("incorporated $CO_2$", see the following examples and Table 1) is normalised to the proportion of polyether carbonate polyol molecule formed in the copolymerisation and optionally in the activation steps in the presence of $CO_2$ (i.e. the proportion of polyether carbonate polyol molecule resulting from the starter (1,8-octanediol) and from the reaction of the starter with epoxide, which was added under $CO_2$-free conditions, was not taken into consideration here).

Complex-forming component used
K-1: difunctional polypropylene glycol having a molar mass of 1000 g/mol
K-2: poly(tetramethylene ether diol) having a molar mass of 650 g/mol
K-3: polyethylene glycol diol having a molar mass of 1000 g/mol
K-4: polycarbonate diol having a molar mass of 2000 g/mol, based on 1,6-hexanediol as difunctional hydroxy compound
K-5: polycarbonate diol having a molar mass of 2000 g/mol, based on a mixture of 71.4 parts by weight of 1,4-butanediol and 28.6 parts by weight of 1,6-hexanediol as difunctional hydroxy compounds
K-6: trifunctional polyether carbonate polyol having a molar mass of 3000 g/mol and a $CO_2$ content of 14 wt. %, obtained by DMC-catalysed copolymerisation of propylene oxide and $CO_2$ The molar mass is the number-average molecular weight, calculated from the experimentally determined OH value.

Example 1 (Comparison)

Catalyst Cat-1

The catalyst was produced using an apparatus according to FIG. 4 from WO-A 01/39883.

A solution of 258 g of zinc chloride in 937 g of distilled water and 135 g of tert-butanol was circulated at 50° C. in a loop reactor comprising a jet disperser according to FIG. 2 from WO-A 01/39883 with a bore (diameter 0.7 mm). A solution of 26 g of potassium hexacyanocobaltate (0.078 mol) in 332 g of distilled water was added. The pressure drop in the jet disperser was 2.5 bar. The dispersion formed was then circulated for 60 min at 50° C., with a pressure drop in the jet disperser of 2.5 bar. Then a mixture consisting of 5.7 g of tert-butanol, 159 g of distilled water and 27.6 g of complex-forming component K-1 was added and the dispersion was then circulated for 80 min at 50° C., with a pressure drop in the jet disperser of 2.5 bar.

230 g of the dispersion obtained were filtered in a pressure nutsche with a filter surface area of 20 cm$^3$ and then washed with a mixture consisting of 82 g of tert-butanol, 42.3 g of distilled water and 1.7 g of complex-forming component K-1. The washed filter cake was mechanically pressed between two strips of filter paper and then dried for 2 h at 60° C. under high vacuum at approx. 0.05 bar (absolute).

Example 2

Catalyst Cat-2

The catalyst was produced using an apparatus according to FIG. 4 from WO-A 01/39883.

A solution of 258 g of zinc chloride in 937 g of distilled water and 135 g of tert-butanol was circulated at 50° C. in a loop reactor comprising a jet disperser according to FIG. 2 from WO-A 01/39883 with a bore (diameter 0.7 mm). A solution of 26 g of potassium hexacyanocobaltate (0.078 mol) in 332 g of distilled water was added. The pressure drop in the jet disperser was 2.5 bar. The dispersion formed was then circulated for 60 min at 50° C., with a pressure drop in the jet disperser of 2.5 bar. Then a mixture consisting of 5.7 g of tert-butanol, 159 g of distilled water and 27.6 g of complex-forming component K-2 was added and the dispersion was then circulated for 80 min at 50° C., with a pressure drop in the jet disperser of 2.5 bar.

230 g of the dispersion obtained were filtered in a pressure nutsche with a filter surface area of 20 cm$^3$ and then washed with a mixture consisting of 82 g of tert-butanol, 42.3 g of distilled water and 1.7 g of complex-forming component K-2. The washed filter cake was mechanically pressed between two strips of filter paper and then dried for 2 h at 60° C. under high vacuum at approx. 0.05 bar (absolute).

Example 3

Catalyst Cat-3

The catalyst was produced using an apparatus according to FIG. 4 from WO-A 01/39883.

A solution of 258 g of zinc chloride in 937 g of distilled water and 135 g of tert-butanol was circulated at 50° C. in a loop reactor comprising a jet disperser according to FIG. 2 from WO-A 01/39883 with a bore (diameter 0.7 mm) A solution of 26 g of potassium hexacyanocobaltate (0.078 mol) in 332 g of distilled water was added. The pressure drop in the jet disperser was 2.5 bar. The dispersion formed was then circulated for 60 min at 50° C., with a pressure drop in the jet disperser of 2.5 bar. Then a mixture consisting of 5.7 g of tert-butanol, 159 g of distilled water and 27.6 g of complex-forming component K-3 was added and the dispersion was then circulated for 80 min at 50° C., with a pressure drop in the jet disperser of 2.5 bar.

230 g of the dispersion obtained were filtered in a pressure nutsche with a filter surface area of 20 cm$^3$ and then washed with a mixture consisting of 82 g of tert-butanol, 42.3 g of distilled water and 1.7 g of complex-forming component K-3. The washed filter cake was mechanically pressed between two strips of filter paper and then dried for 2 h at 60° C. under high vacuum at approx. 0.05 bar (absolute).

Example 4

Catalyst Cat-4

The catalyst was produced using an apparatus according to FIG. 4 from WO-A 01/39883.

A solution of 258 g of zinc chloride in 937 g of distilled water and 135 g of tert-butanol was circulated at 50° C. in a loop reactor comprising a jet disperser according to FIG. 2 from WO-A 01/39883 with a bore (diameter 0.7 mm). A solution of 26 g of potassium hexacyanocobaltate (0.078 mol) in 332 g of distilled water was added. The pressure drop in the jet disperser was 2.5 bar. The dispersion formed was then circulated for 60 min at 50° C., with a pressure drop in the jet disperser of 2.5 bar. Then a mixture consisting of 5.7 g of tert-butanol, 159 g of distilled water and 27.6 g of complex-forming component K-4 was added and the dispersion was then circulated for 80 min at 50° C., with a pressure drop in the jet disperser of 2.5 bar.

230 g of the dispersion obtained were filtered in a pressure nutsche with a filter surface area of 20 cm$^3$ and then washed with a mixture consisting of 82 g of tert-butanol, 42.3 g of distilled water and 1.7 g of complex-forming component K-4. The washed filter cake was mechanically pressed between two strips of filter paper and then dried for 2 h at 60° C. under high vacuum at approx. 0.05 bar (absolute).

Example 5

Catalyst Cat-5

The catalyst was produced using an apparatus according to FIG. 4 from WO-A 01/39883.

A solution of 258 g of zinc chloride in 937 g of distilled water and 135 g of tert-butanol was circulated at 50° C. in a loop reactor comprising a jet disperser according to FIG. 2 from WO-A 01/39883 with a bore (diameter 0.7 mm). A solution of 26 g of potassium hexacyanocobaltate (0.078 mol) in 332 g of distilled water was added. The pressure drop in the jet disperser was 2.5 bar. The dispersion formed was then circulated for 60 min at 50° C., with a pressure drop in the jet disperser of 2.5 bar. Then a mixture consisting of 5.7 g of tert-butanol, 159 g of distilled water and 27.6 g of complex-forming component K-5 was added and the dispersion was then circulated for 80 min at 50° C., with a pressure drop in the jet disperser of 2.5 bar.

230 g of the dispersion obtained were filtered in a pressure nutsche with a filter surface area of 20 cm$^3$ and then washed with a mixture consisting of 82 g of tert-butanol, 42.3 g of distilled water and 1.7 g of complex-forming component K-5. The washed filter cake was mechanically pressed between two strips of filter paper and then dried for 2 h at 60° C. under high vacuum at approx. 0.05 bar (absolute).

Example 6

Catalyst Cat-6

The catalyst was produced using an apparatus according to FIG. 4 from WO-A 01/39883.

A solution of 258 g of zinc chloride in 937 g of distilled water and 135 g of tert-butanol was circulated at 50° C. in a loop reactor comprising a jet disperser according to FIG. 2 from WO-A 01/39883 with a bore (diameter 0.7 mm). A solution of 26 g of potassium hexacyanocobaltate (0.078 mol) in 332 g of distilled water was added. The pressure drop in the jet disperser was 2.5 bar. The dispersion formed was then circulated for 60 min at 50° C., with a pressure drop in the jet disperser of 2.5 bar. Then a mixture consisting of 5.7 g of tert-butanol, 159 g of distilled water and 27.6 g of complex-forming component K-6 was added and the dispersion was then circulated for 80 min at 50° C., with a pressure drop in the jet disperser of 2.5 bar.

230 g of the dispersion obtained were filtered in a pressure nutsche with a filter surface area of 20 cm³ and then washed with a mixture consisting of 82 g of tert-butanol, 42.3 g of distilled water and 1.7 g of complex-forming component K-6. The washed filter cake was mechanically pressed between two strips of filter paper and then dried for 2 h at 60° C. under high vacuum at approx. 0.05 bar (absolute).

General Instructions for Producing a Polyether Carbonate Polyol:

141 mg of dried DMC catalyst selected from one of Cat-1 to Cat-6 (see Table 1) and 51 g of dried 1,8-octanediol (starter) were placed in a 1-liter pressure reactor with gas metering device. The reactor was heated to 130° C. and rendered inert by repeated pressurization of nitrogen to approx. 5 bar and subsequent pressure release to approx. 1 bar. This process was performed three times. 25 g of propylene oxide (PO) were introduced into the reactor at 130° C. in the absence of $CO_2$, i.e. 0 bar $CO_2$. The start of the reaction was evidenced by a temperature peak (hotspot) and by a pressure drop to the starting pressure (approx. 1 bar). After the first pressure drop 20 g of PO followed by 19 g of PO were metered in quickly, again resulting each time in a temperature peak and a pressure drop. After pressurising the reactor with 50 bar $CO_2$, 50 g of PO were metered in quickly, resulting in a temperature peak after a waiting time [time 1]. Beyond this time of the temperature peak the overall pressure in the reactor tended to fall. The pressure in the reactor was controlled so that the pressure was held constant at the above pressure 1 by regular introduction of $CO_2$. Following activation the remaining propylene oxide (435 g) was pumped into the reactor continuously at a rate of approx. 1.8 g/min, whilst the temperature was reduced to 105° C. in increments of 5° C. every five minutes. On completion of the PO addition stirring (1500 rpm) was continued for a further 60 minutes at 105° C. and under the pressure of 50 bar. The composition of the reaction mixture obtained in each case is shown in Table 1.

It can be seen from Table 1 that in the production of polyether carbonate polyols from an H-functional starter substance, propylene oxide and carbon dioxide, selectivity in favour of the linear product is improved if a DMC catalyst is used that comprises a complex-forming component within the meaning of the present invention.

TABLE 1

Results of polyether carbonate polyol production

| Ex. | Catalyst | Time 1 [min] | $CO_2$ incorporation [wt. %] | Selectivity cyclic/linear | OH value [mg KOH/g] |
|---|---|---|---|---|---|
| 7* | Cat-1 | 33 | 19.9 | 0.21 | 67.2 |
| 8 | Cat-2 | 70 | 20.2 | 0.16 | 67.0 |
| 9 | Cat-3 | 90 | 19.6 | 0.18 | 66.5 |
| 10 | Cat-4 | 110 | 20.3 | 0.13 | 66.9 |
| 11 | Cat-5 | 63 | 20.2 | 0.16 | 65.0 |
| 12 | Cat-6 | 31 | 21.7 | 0.17 | 65.0 |

*= comparative example

The invention claimed is:

1. A method for producing a polyether carbonate polyol from one or more H-functional starter substances, one or more alkylene oxides and carbon dioxide, in the presence of a double metal cyanide (DMC) catalyst, wherein the DMC catalyst comprises at least one complex-forming component selected from the group consisting of polycarbonate diol, polyether carbonate polyol, polyethylene glycol diol and poly (tetramethylene ether diol).

2. The method according to claim 1, comprising
   (α) preparing the H-functional starter substance or a mixture of at least two H-functional starter substances,
   (β) adding, for activation purposes a part amount (relative to the total amount of the amount of alkylene oxides used in steps (β) and (γ)) of one or more alkylene oxides to the mixture resulting from step (α), optionally in the presence of $CO_2$, and wherein the temperature peak (hotspot) occurring because of the subsequent exothermic chemical reaction and/or a pressure drop in the reactor is then awaited, and optionally performing step (β) more than once,
   (γ) adding one or more alkylene oxides and carbon dioxide to the mixture resulting from step (β), wherein the alkylene oxides used in step (γ) is same as or is different from the alkylene oxides used in step (β).

3. The method according to claim 1, wherein the DMC catalyst comprises as the complex-forming component poly (tetramethylene ether diol) having a molar mass from 500 to 5000 g/mol.

4. The method according to claim 1, wherein the DMC catalyst comprises as the complex-forming component polyethylene glycol diol having a molar mass from 500 to 2500 g/mol.

5. The method according to claim 1, wherein in that the DMC catalyst comprises as the complex-forming component polyether carbonate polyol having a molar mass from 500 to 5000 g/mol.

6. The method according to claim 1, wherein in that the DMC catalyst comprises as the complex-forming component polyether carbonate polyol having a molar mass from 1000 to 3000 g/mol.

7. The method according to claim 1, wherein in that the DMC catalyst comprises as the complex-forming component polycarbonate diol having a molar mass from 500 to 5000 g/mol.

8. The method according to claim 1, wherein the DMC catalyst is obtained by
   (a) in the first step, reacting an aqueous solution of a metal salt with an aqueous solution of a metal cyanide salt in the presence of one or more organic complex ligands,
   (b) in a second step, separating the solid from the suspension obtained from (i),
   (c) optionally, in a third step, washing the isolated solid with an aqueous solution of an organic complex ligand,
   (d) drying the solid obtained at a temperature of 20 to 120° C. and under pressure of 0.1 mbar to 1013 mbar, wherein in the first step or immediately after precipitation of the double metal cyanide compound (second step) one or more organic complex ligands and at least one complex-forming component are added, wherein the complex-forming component is selected from at least one of the group consisting of polycarbonate diol, polyether carbonate polyol, polyethylene glycol diol and poly(tetramethylene ether diol).

* * * * *